United States Patent
Wegmann et al.

(10) Patent No.: US 12,278,743 B2
(45) Date of Patent: Apr. 15, 2025

(54) QOE MEASUREMENT COLLECTION IN NON-CONNECTED STATE

(71) Applicant: NOKIA TECHNOLOGIES OY, Espoo (FI)

(72) Inventors: Bernhard Wegmann, Holzkirchen (DE); Ugur Baran Elmali, Munich (DE); Jing He, Beijing (CN); Guillaume Decarreau, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/927,287

(22) Filed: Oct. 25, 2024

(65) Prior Publication Data
US 2025/0055770 A1    Feb. 13, 2025

Related U.S. Application Data

(63) Continuation of application No. PCT/CN2022/110963, filed on Aug. 8, 2022.

(51) Int. Cl.
*H04L 41/5067* (2022.01)
*H04W 8/22* (2009.01)
(Continued)

(52) U.S. Cl.
CPC ........... *H04L 41/5067* (2013.01); *H04W 8/22* (2013.01); *H04W 76/10* (2018.02); *H04W 76/20* (2018.02)

(58) Field of Classification Search
CPC .... H04L 41/5067; H04W 8/22; H04W 76/10; H04W 76/20
See application file for complete search history.

(56) References Cited

U.S. PATENT DOCUMENTS 10,015,687 B2    7/2018    Van Lieshout et al.
2013/0326551 A1  12/2013   Chatterjee et al.
(Continued)

FOREIGN PATENT DOCUMENTS

CN    110402593 A      11/2019
WO    WO 2022/005379 A1   1/2022
(Continued)

OTHER PUBLICATIONS

"3rd Generation Partnership Project; Technical Specification Group Core Network and Terminals; AT command set for User Equipment (UE) (Release 17)", 3GPP TS 27.007 v17.6.0, (Jun. 2022), 438 pages.
(Continued)

*Primary Examiner* — Joseph E Dean, Jr.
(74) *Attorney, Agent, or Firm* — ALSTON & BIRD LLP

(57) ABSTRACT

Example embodiments of the present disclosure relate to QoE measurement collection in non-connected State. In an example method, a terminal device receives, from an access network device, a quality of experience (QoE) measurement collection (QMC) procedure configuration indicating whether a QMC procedure is to be continued when the terminal device enters into a non-connected state. Then, the terminal device logs, in a logging buffer, QMC logging data of the QMC procedure performed at the terminal device in the non-connected state based on determining that the QMC procedure configuration indicates that the QMC procedure is to be continued when the terminal device enters into the non-connected state. In this way, QMC data collected in a non-connected state can be stored in the logging buffer so that the needed QMC data collected during non-connected state can be maintained.

20 Claims, 9 Drawing Sheets

(51) Int. Cl.
  *H04W 76/10* (2018.01)
  *H04W 76/20* (2018.01)

(56) References Cited

U.S. PATENT DOCUMENTS

| | | |
|---|---|---|
| 2021/0051536 A1 | 2/2021 | Yang et al. |
| 2021/0144567 A1 | 5/2021 | Goswami et al. |
| 2022/0210031 A1 | 6/2022 | Hu et al. |
| 2023/0116324 A1* | 4/2023 | Eklöf .............. H04L 41/0806 370/331 |
| 2024/0406792 A1* | 12/2024 | Choi .............. H04W 24/10 |

FOREIGN PATENT DOCUMENTS

| | | |
|---|---|---|
| WO | WO 2022/029465 A1 | 2/2022 |
| WO | WO 2022/150406 A1 | 7/2022 |

OTHER PUBLICATIONS

"3rd Generation Partnership Project; Technical Specification Group Radio Access Network; NR; Radio Resource Control (RRC) protocol specification (Release 17)", 3GPP TS 38.331 v17.1.0, (Jun. 2022), 1273 pages.

"3rd Generation Partnership Project; Technical Specification Group Radio Access Network; Study on NR QoE (Quality of Experience) management and optimizations for diverse services (Release 17)", 3GPP TR 38.890 v17.0.0, (Apr. 2021), 18 pages.

"3rd Generation Partnership Project; Technical Specification Group Services and System Aspects; Telecommunication management; Quality of Experience (QoE) measurement collection Control and configuration (Release 17)", 3GPP TS 28.405 v17.2.0, (Jun. 2022), 24 pages.

"3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 17)", 3GPP TS 26.247 v17.1.0, (Jun. 2022), 143 pages.

CATT, "Discussion on QoE collection start and stop", 3GPP TSG-RAN WG2 Meeting #113bis-e, R2-2104035, (Apr. 12-20, 2021), 5 pages.

China Unicom, "New SID: Study on NR QoE management and optimizations for diverse services ", 3GPP TSG RAN Meeting #86, RP-193256, (Dec. 9-12, 2019), 4 pages.

Ericsson, "Running CR for Introduction of QoE measurements in NR", 3GPP TSG-RAN WG2 Meeting #114-e, R2-2105895, (May 19-27, 2021), 925 pages.

International Search Report and Written Opinion for Patent Cooperation Treaty Application No. PCT/CN2022/110963 dated Dec. 20, 2022, 9 pages.

Lenovo, "Report from email discussion [AT114-e][027][QoE] Start and Stop (Lenovo)—Phase 2 (LS out)", 3GPP TSG RAN WG2 Meeting #114-e, R2-2106761, (May 19-27, 2021), 12 pages.

Office Action for Canadian Application No. 3,257,673 dated Jan. 7, 2025, 4 pages.

\* cited by examiner

QOE MEASUREMENT COLLECTION IN NON-CONNECTED STATE

RELATED APPLICATION

This application claims the benefit of PCT Application No. PCT/CN2022/110963, filed on Aug. 8, 2022, which is incorporated herein by reference in its entirety.

FIELD

Various example embodiments relate to the field of telecommunication, and in particular, to a terminal device, an access network device, a core network device, methods, apparatuses and a computer readable storage medium for QoE measurement collection in a non-connected state of the terminal device.

BACKGROUND

One main motivation of mobile network evolution is to improve the user experience. This is why the evaluation of the user experience at a user equipment (UE) side is vital to network operators, especially when the operators provide some real-time services, for example like streaming services (typically video services). In these services, even intermittent quality degradation is very unpleasant. Many of these streaming services are a significant part of the commercial traffic growth rate. Therefore the focus is on the end users' experience.

In this regard, Quality of Experience (QoE) information collection provides detailed information at call level on a number of UEs. The capability to log information within a UE, and in particular the QoE of an end user service, initiated by an operator, provides the operator with QoE information. The collected information cannot be deduced from performance measurements in the mobile network. The QoE information is information measured by the end user's application layer in the UE. The measured QoE information is collected by the management system for analysis and/or KPI calculations. Furthermore in Rel-17, 3GPP has been started to study NR QoE management and optimizations for diverse services, in order to identify a framework for collecting and reporting of NR QoE measurements and to study the potential impact on the related RAN interfaces.

SUMMARY

In general, example embodiments of the present disclosure provide a solution for QoE measurement collection in a non-connected state of a UE.

In a first aspect, there is provided a terminal device. The terminal device comprises at least one processor and at least one memory storing instructions. The instructions, when executed by the at least one processor, cause the terminal device at least to: receive, from an access network device, a quality of experience, QoE, measurement collection, QMC, procedure configuration indicating whether a QMC procedure is to be continued when the terminal device enters into a non-connected state; and based on determining that the QMC procedure configuration indicates that the QMC procedure is to be continued when the terminal device enters into the non-connected state, log, in a logging buffer, QMC logging data of the QMC procedure performed at the terminal device in the non-connected state.

In a second aspect, there is provided an access network device. The access network device comprises at least one processor; and at least one memory storing instructions. The instructions, when executed by the at least one processor, cause the access network device at least to: receive, from a core network device, a quality of experience, QoE, measurement collection, QMC, procedure request; determine whether the QMC procedure request includes an indication of whether a QMC procedure is to be continued when a terminal device enters into a non-connected state; based on determining that the QMC procedure request includes the indication, determine a QMC procedure configuration indicating whether the QMC procedure is to be continued when the terminal device enters into the non-connected state; and transmit the QMC procedure configuration to the terminal device.

In a third aspect, there is provided a core network device. The core network device comprises at least one processor; and at least one memory storing instructions. The instructions, when executed by the at least one processor, cause the core network device at least to: determine whether a quality of experience, QoE, measurement collection, QMC, procedure is to be continued when a terminal device enters into a non-connected state; and transmit, to an access network device, a QMC procedure request comprising an indication of whether the QMC procedure is to be continued when the terminal device enters into the non-connected state.

In a fourth aspect, there is provided a method performed by a terminal device. The method comprises: receiving, from an access network device, a quality of experience, QoE, measurement collection, QMC, procedure configuration indicating whether the QMC procedure is to be continued when a terminal device enters into a non-connected state; and based on determining that the QMC procedure configuration indicates that the QMC procedure is to be continued when the terminal device enters into the non-connected state, logging, in a logging buffer, QMC logging data of the QMC procedure performed at the terminal device in the non-connected state.

In a fifth aspect, there is provided a method performed by an access network device. The method comprises: receiving, from a core network device, a quality of experience, QoE, measurement collection, QMC, procedure request; determining whether the QMC procedure request includes an indication of whether a QMC procedure is to be continued when a terminal device enters into a non-connected state; based on determining that the QMC procedure request includes the indication, determining a QMC procedure configuration indicating whether the QMC procedure is to be continued when the terminal device enters into the non-connected state; and transmitting the QMC procedure configuration to the terminal device.

In a sixth aspect, there is provided a method performed by a core network device. The method comprises: determining whether a quality of experience, QoE, measurement collection, QMC, procedure is to be continued when a terminal device enters into a non-connected state; and transmitting, to an access network device, a QMC procedure request comprising an indication of whether the QMC procedure is to be continued when the terminal device enters into the non-connected state.

In a seventh aspect, there is provided a first apparatus. The first apparatus comprises: means for receiving, from an access network device, a quality of experience, QoE, measurement collection, QMC, procedure configuration indicating whether a QMC procedure is to be continued when the first apparatus enters into a non-connected state; and means for logging, in a logging buffer, QMC logging data of the QMC procedure performed at the first apparatus in the non-connected state based on determining that the QMC procedure configuration indicates that the QMC procedure is to be continued when the first apparatus enters into the non-connected state.

In an eighth aspect, there is provided a second apparatus. The second apparatus comprises: means for receiving, from a core network device, a quality of experience, QoE, measurement collection, QMC, procedure request; means for determining whether the QMC procedure request includes an indication of whether a QMC procedure is to be continued when a terminal device enters into a non-connected state; means for determining a QMC procedure configuration indicating whether the QMC procedure is to be continued when the terminal device enters into the non-connected state based on determining that the QMC procedure request includes the indication; and means for transmitting the QMC procedure configuration to the terminal device.

In a ninth aspect, there is provided a third apparatus. The third apparatus comprises: means for determining whether a quality of experience, QoE, measurement collection, QMC, procedure is to be continued when a terminal device enters into a non-connected state; and means for transmitting, to an access network device, a QMC procedure request comprising an indication of whether the QMC procedure is to be continued when the terminal device enters into the non-connected state.

In a tenth aspect, there is provided a terminal device. The terminal device comprises: receiving circuitry configured to receive, from an access network device, a quality of experience, QoE, measurement collection, QMC, procedure configuration indicating whether a QMC procedure is to be continued when the terminal device enters into a non-connected state; and logging circuitry configured to log, in a logging buffer, QMC logging data of the QMC procedure performed at the terminal device in the non-connected state based on determining that the QMC procedure configuration indicates that the QMC procedure is to be continued when the terminal device enters into the non-connected state.

In a eleventh aspect, there is provided an access network device. The access network device comprises: receiving circuitry configured to receive, from a core network device, a quality of experience, QoE, measurement collection, QMC, procedure request; first determining circuitry configured to determine whether the QMC procedure request includes an indication of whether a QMC procedure is to be continued when a terminal device enters into a non-connected state; second determining circuitry configured to determine a QMC procedure configuration indicating whether the QMC procedure is to be continued when the terminal device enters into the non-connected state based on determining that the QMC procedure request includes the indication; and transmitting circuitry configured to transmit the QMC procedure configuration to the terminal device.

In a twelfth aspect, there is provided a core network device. The core network device comprises: determining circuitry configured to determine whether a quality of experience, QoE, measurement collection, QMC, procedure is to be continued when a terminal device enters into a non-connected state; and transmitting circuitry configured to transmit, to an access network device, a QMC procedure request comprising an indication of whether the QMC procedure is to be continued when the terminal device enters into the non-connected state.

In a thirteenth aspect, there is provided a terminal device. The terminal device comprises at least one processor and at least one memory storing computer program codes. The at least one memory and the computer program codes are configured to, with the at least one processor, cause the terminal device to perform the method in the fourth aspect.

In a fourteenth aspect, there is provided an access network device. The access network device comprises at least one processor and at least one memory storing computer program codes. The at least one memory and the computer program codes are configured to, with the at least one processor, cause the access network device to perform the method in the fifth aspect.

In an fifteenth aspect, there is provided a core network device. The core network device comprises at least one processor and at least one memory storing computer program codes. The at least one memory and the computer program codes are configured to, with the at least one processor, cause the core network device to perform the method in the sixth aspect.

In a sixteenth aspect, there is provided a non-transitory computer readable medium comprising program instructions for causing an apparatus to perform at least the method in the fourth, fifth and sixth aspects.

In a seventeenth aspect, there is provided a computer program comprising instructions, which, when executed by an apparatus, cause the apparatus to perform at least the method in the fourth, fifth and sixth aspects.

In a eighteenth aspect, there is provided a computer program comprising instructions for performing at least the method in the fourth, fifth and sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1A:
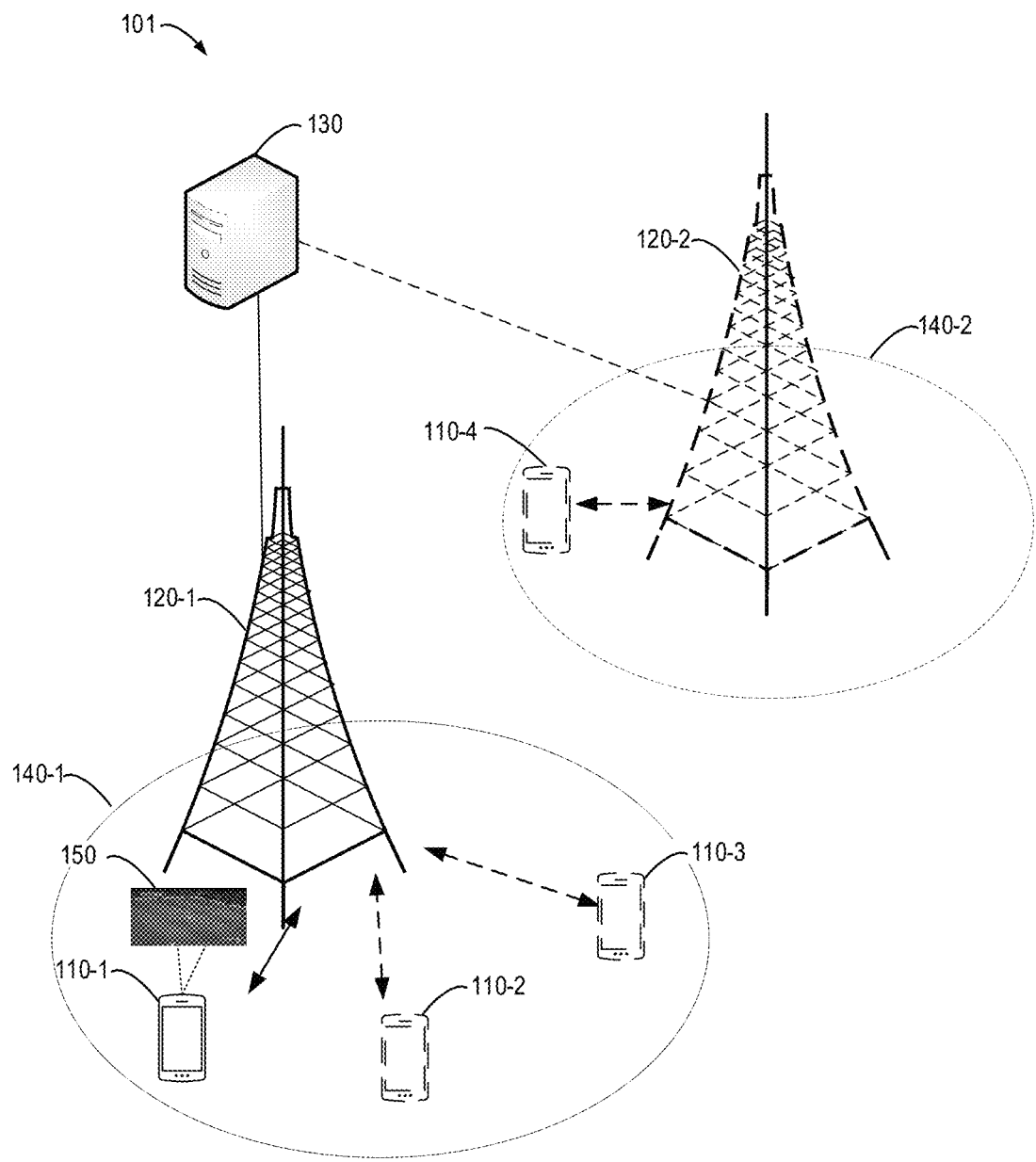
FIG. 1A illustrates an example of a network environment in which some example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a headmounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In Rel-17, Multicast Broadcast Services (MBS) are defined. MBS (formerly called (e)MBMS in former releases) has been considered to allow for resource efficient transmission to multiple end users which require to receive same contents. Since broadcasting is spreading information only in downlink (DL), it can be even used in idle mode, i.e., all UEs in the broadcast service area are authorized to receive the data. As discussed above, the QoE measurement data is important for the measure of end-user perceived quality of the service. For example, for a TV broadcast via MBS in NR, the QoE reflects the subjective perception and the acceptance level of the TV quality.

Traditionally, QoE measurement is specific to radio resource control (RRC) connected UEs, where a subset of QoE metrics collected from the UE are used by RAN for further optimizations. In RRC connected state, the QoE metrics can be transmitted in time. However, the collected QoE metrics cannot be reported as long as the UE is in RRC idle/inactive state. Conventionally, QoE metrics, i.e., QMC data could be stored in the UE and reported to the network (e.g. MCE, measurement collection entity) when the UE is coming back to RRC connected state.

For the case of MBS services, due to the fact that MBS services can be used by the UEs in RRC idle/inactive state while a QoE Measurement Collection (QMC) is activated and there are no measurement reporting as specified for application layer, QMC data would be directly mapped into the measReportAppLayerContainer on RRC layer for measurement reporting to the network side. Then, the measReportAppLayerContainer will be stored in the UE at first and reported when the RRC connection is resumed or re-established. However, the UE may stay in RRC non-connected state for a long period of time while QMC is activated. Due to the size limitation, the content of measReportAppLayerContainer might be overwritten several times until the RRC connection is resumed or re-established which would result in loss of needed QMC data.

Example embodiments of the present disclosure provide a mechanism to solve the above discussed issues, especially how to enable a terminal device to store report of QMC procedure performed by the terminal device in a non-connected state in the logging buffer. The example embodiments of the present disclosure enables the UE to store QMC data collected in a non-connected state so that the needed QMC data collected during non-connected state can be transmitted to the network side. Principles and some example embodiments of the present disclosure will be described in detail below with reference to the accompanying drawings.

FIG. 1A illustrates an example of a network environment 101 in which some example embodiments of the present disclosure may be implemented. In the descriptions of the example embodiments of the present disclosure, the network environment 101 may also be referred to as a communication system 101 (for example, a portion of a communication network). For illustrative purposes only, various aspects of example embodiments will be described in the context of one or more core network devices, access network devices, and terminal devices that communicate with one another. It should be appreciated, however, that the description herein may be applicable to other types of apparatus or other similar apparatuses that are referenced using other terminology.

The communication system 101 includes terminal devices 110-1, 110-2, 110-3 and 110-4 (collectively referred to as terminal devices 110), access network devices 120-1 and 120-2 (collectively referred to as access network devices 120) and a core network device 130. The access network devices 120 in the communication system 101 provide one or more services (for example, connection service) for one or more terminal devices 110. The communications between one of the terminal devices 110 and the core network device 130 may be performed via one or more of the access network devices 120.

While only some of the terminal devices 110 are illustrated in FIG. 1, it is appreciated that any number of terminal devices or devices considered user equipment may be in communication with any number of access network devices or devices considered access network devices. In addition, while FIG. 1 depicts the terminal devices 110-1, 110-2, 110-3 and 110-4 as mobile phones, the terminal devices 110 may be any type of user equipment. Further, the terminal devices 110-1, 110-2, 110-3 are in the area of a cell 140-1 hosted by the access network devices 120-1 and/or the terminal device 110-4 is in the area of a cell 140-2 hosted by the access network devices 120-2.

The access network devices 120 may communicate with the core network device 130 and the core network device 130 may provide various services to the terminal devices 110 via access network devices 120. As illustrated in FIG. 1, a TV broadcast service 150 of a football match is running on the terminal device 110-1. In order to determine a subjective perception and the acceptance level of the TV quality, a Quality of Experience (QoE), i.e., an application layer (AL) measure of end-user perceived quality of the service can be measured and the corresponding measurement data can be collected for subsequent analysis. It should be appreciated that the terminal devices 110-2, 110-3 and 110-4 as well as the access network device 120-2 are optional for various example embodiments of the present disclosure.

The core network device 130 may comprise some suitable network entities, for example, core network entities described in various example embodiments of the present disclosure, such as a measurement collector entity (MCE) 131, a network manager (NM) 133, a domain manager/element manager (DM/EM) 135 to facilitate QoE measurements. Conventional solutions only foresee an operation with respect to run and collect QoE measurements and to report them for the RRC connected state. The management based process as described in is illustrated in FIG. 1B.

Figure 1B:
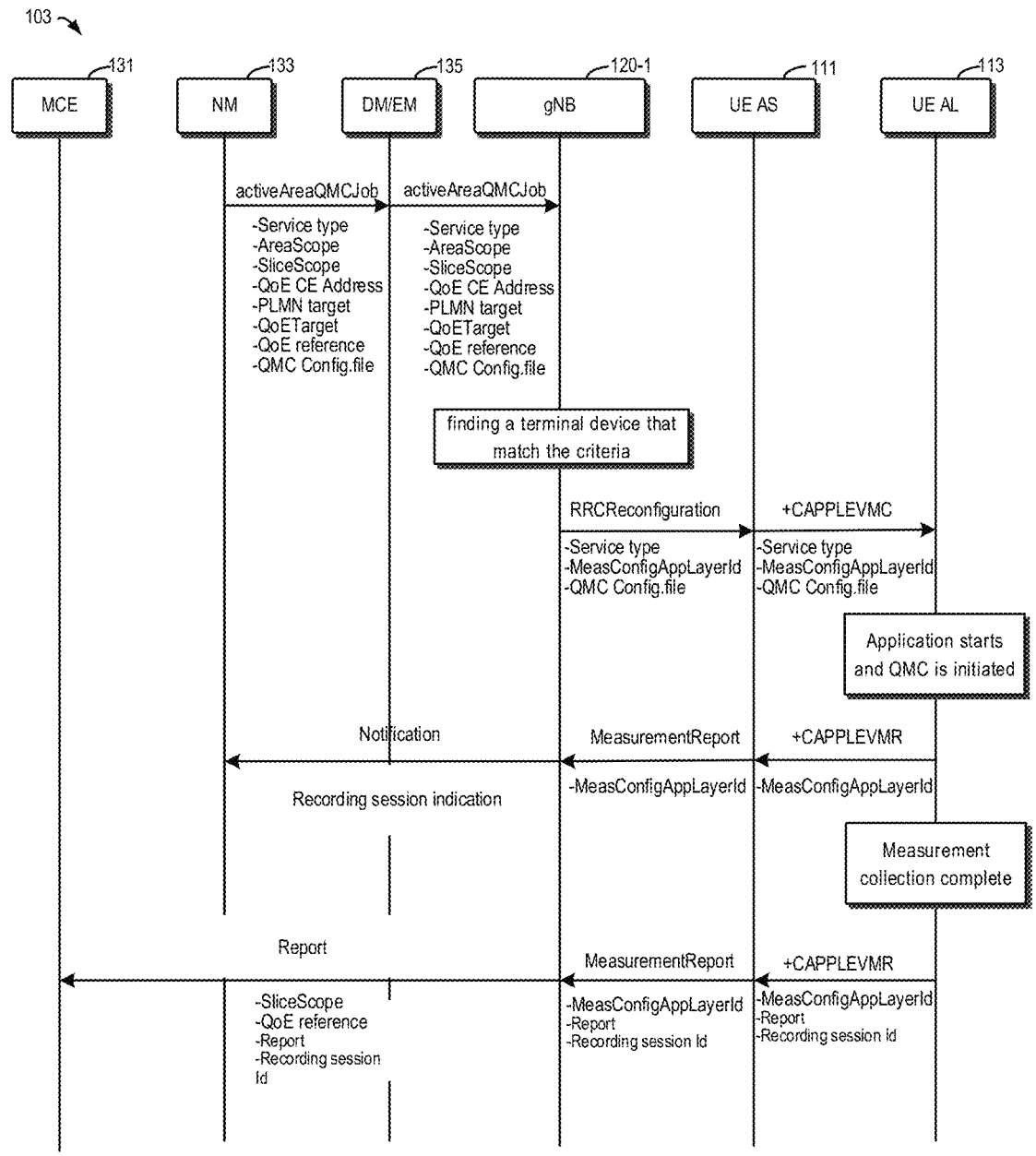
FIG. 1B illustrates an example of a process flow for a QMC procedure in a connected state of a UE with which some example embodiments of the present disclosure may be implemented together.

FIG. 1B illustrates an example of a process flow 103 with which some example embodiments of the present disclosure may be implemented together. Specifically, FIG. 1B shows activation of measurement collection job and reporting of collected information in NR. Generally, a QMC procedure may involve activation of a network request session, terminal device request session and logging session and also the reporting of logged measurement data. As illustrated in FIG. 1B, the core network device 130 includes three network entities, namely, the MCE 131, the NM 133 and the DM/EM 135. The terminal device 110 includes an access stratum (AS) 111 and an application layer (AL) 112. It should be appreciated that the AS 111 may include a RRC layer. The terms "AS 111" and "RRC 111" can be used interchangeably hereinafter.

FIG. 1B specifically illustrates the signaling exchange during the QMC procedure in connected state. In the procedure, the UE internal AT commands for Application Level Measurement Configuration (+CAPPLEVMCNR) and Application Level Measurement Reporting (+CAPPLEVMRNR) have been used. +CAPPLEVMR may consist of following elements shown in Table 1.

TABLE 1

+CAPPLEVMRNR command sytax

| Command | Possible response(s) |
| --- | --- |
| +CAPPLEVMR= (list of [<CR><LF><app-meas_report_length>,<app-meas_report>,<meas_config_app_layer_id>])<br>+CAPPLEVMR=? | +CME ERROR: <err> |

Furthermore, the normative QMC functionalities are defined AL service specific, e.g. for streaming services over HTTP. The QoE metric being collected in the AL will be stored in a compressed mode in an octet string container with a maximum length of 8000 bytes. The container shall be delivered via RRC to the gNB with "measReportApplicationLayer". In addition, an AT command to share RRC state information with AL are existing and used. The corresponding AT command is called +CSCON.

As illustrated in FIG. 1B, once the QMC procedure is completed, the QMC report can be transmitted to the MCE 131 in time due to the terminal device 110 being RRC connected with the access network device 120-1 where uplink transmission is available. As mentioned above, some services can be running in a non-connected mode, i.e., RRC idle/inactive mode where uplink transmission may be not available. If QMC procedure is disabled in RRC non-connected state, some important QMC data may not be collected. In this regard, a QMC procedure in the non-connected mode in accordance with some example embodiments of the present disclosure will be performed. Hereinafter, the QMC procedure in the non-connected mode will be described in details with reference to FIG. 2 as a supplement to the QMC procedure in connected state as illustrated in FIG. 1B.

Figure 2:
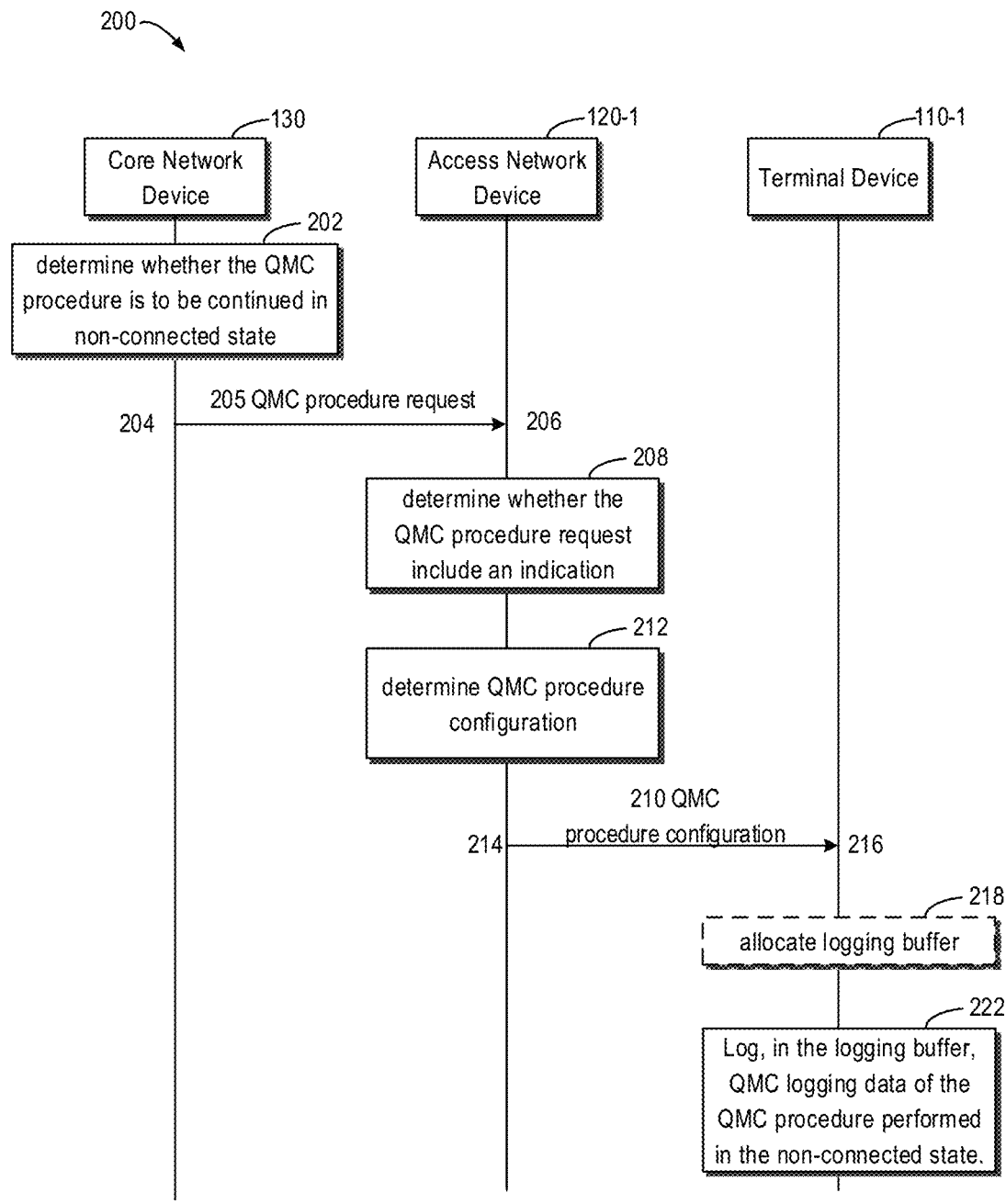
FIG. 2 illustrates an example of a process flow for performing a QMC procedure in a non-connected state of a UE in accordance with some example embodiments of the present disclosure.

FIG. 2 illustrates an example of a process flow 200 for performing QMC procedure in non-connected state in accordance with some example embodiments of the present disclosure. For the purpose of discussion, the process flow 201 will be described with reference to FIGS. 1A-1B. It would be appreciated that although the process flow 200 has been described referring to the network environment 100 of FIG. 1A, this process flow 200 may be likewise applied to other similar communication scenarios.

In the process flow 201, before initiating a QMC procedure, the core network device 130 determines (202) whether the QMC procedure is to be continued in non-connected state. Then, the core network device 130 transmits (204) a QMC procedure request 205 to the access network device 120-1. Upon receiving (206) the QMC procedure request 205, the access network device 120-1 determines (208) whether the QMC procedure request 205 include an indication of whether a QMC procedure is to be continued when the terminal device 110-1 enters into a non-connected state. If the access network device 120-1 determines that the QMC procedure request 205 includes the indication, the access network device 120-1 determines (212) a QMC procedure configuration 210 indicating whether the QMC procedure is to be continued when the terminal device enters into the non-connected state in accordance with the indication received from the core network device 130. In some alternative embodiments, if the access network device 120-1 determines that the QMC procedure request 205 does not include the indication, the access network device 120-1 determines a QMC procedure configuration 210 in accordance with a service associated with the QMC procedure request. For example, if the access network 120-1 does not receive the indication, the access network 120-1 may determine whether the QMC procedure is to be continued when the terminal device enters into the non-connected state based on type or attribute of the service indicated by the QMC procedure request 205.

After determining the QMC procedure configuration 210, the access network device 120-1 transmits (214) the QMC procedure configuration 210 to the terminal device 110-1. Accordingly, the terminal device 110-1 receives (216) the QMC procedure configuration 210 from the access network device 120-1. If the QMC procedure configuration 210 indicates that the QMC procedure is to be continued when the terminal device 110-1 enters into the non-connected state, the terminal device 110-1 logs (222) the QMC logging data of the QMC procedure performed at the terminal device 110-1 in the non-connected state in a logging buffer. On the other hand, if the QMC procedure configuration 210 indicates that the QMC procedure is to be stopped when the terminal device 110-1 enters into the non-connected state, then the terminal device 110-1 can stop the QMC procedure in the non-connected state. In this way, by logging the QMC data collected in a non-connected state in the logging buffer, the needed QMC data collected during non-connected state can be maintained without loss.

In some example embodiments, the logging buffer may be pre-allocated by the terminal device 110-1 for recoding the QMC logging data of the QMC procedure. In some other example embodiments, the logging buffer may be allocated by the terminal device 110-1 upon receiving (216) the QMC procedure configuration 210. For example, as shown in FIG. 2, when the terminal device 110-1 receives (216) the QMC procedure configuration 210, the terminal device 110-1 may allocates (218) a logging buffer based on the QMC procedure configuration 210. The logging buffer may be allocated for each service associated with QMC procedure request 205. Alternatively, the logging buffer may be allocated for all the services associated with all the QMC procedure requests 205. In some example embodiments, the terminal device 110-1 may allocate a plurality of logging buffers corresponding to a plurality of QMC procedure request, and the QMC procedure configuration is received for each of the plurality of QMC procedures. In other words, a plurality of logging buffers may exist in the terminal device 110-1 at the same time and the logging buffers are configured independently of each other.

In order to allocate the logging buffer, some further parameters for the logging buffer may be needed. Therefore, the QMC procedure configuration 210 may include further indications to facilitate the allocation of the logging buffer. In some example embodiments, the further indications may include an indication of a buffer size of the logging buffer. The buffer size of the logging buffer may be determined by the access network device 120-1 based on a storage capability information previously received from the terminal device 110-1.

In some example embodiments, the further indications may include an indication of a size threshold for the logging buffer. The size threshold may be an absolute threshold or a relative threshold. For example, the size threshold may be a specific amount of data, or a percentage of the buffer size of the logging buffer.

In some example embodiments, the further indications may include an indication of a location of the logging buffer. For example, the logging buffer may be allocated in the RRC layer, or may also be allocated in the application layer.

In some example embodiments, the further indications may include an indication of an applied state of the logging buffer. The non-connected state may include a RRC idle state and a RRC inactive state. The QMC procedure configuration 210 may indicate in which state the logging buffer is to be used. The logging buffer associated with one service may be differently configured for different states.

In some example embodiments, the further indications may include an indication of an indication as to how the QMC procedure is controlled when the size threshold or the buffer size is exceeded. The actions to be taken by the terminal device 110-1 when the size threshold or the buffer size is exceeded can be defined in the QMC procedure configuration 210. For example, when the size of the QMC logging data logged in the logging buffer exceeds the predefined size threshold or the buffer size, the terminal device 110-1 in the RRC inactive state may resume a connection with the access network device 120-1. If the terminal device 110-1 is in the RRC idle state, the terminal device 110-1 may initiate a connection with the access network device 120-1. After the connection is established the terminal device may transmit a report of the QMC logging data to the access network device 120-1 and clearing the logging buffer.

In some alternative embodiments, when the size of the QMC logging data exceeds the predefined size threshold or the buffer size, the terminal device 110-1 may stop logging QMC logging data and discarding new QMC logging data. In some further alternative embodiments, when the size of the QMC logging data exceeds the predefined size threshold or the buffer size, the terminal device 110-1 may overwrite the logged QMC logging data (for example the oldest QMC logging data) with new QMC logging data, i.e., the newly-collected QMC data after the size threshold or the buffer size is exceeded.

Figure 3A:
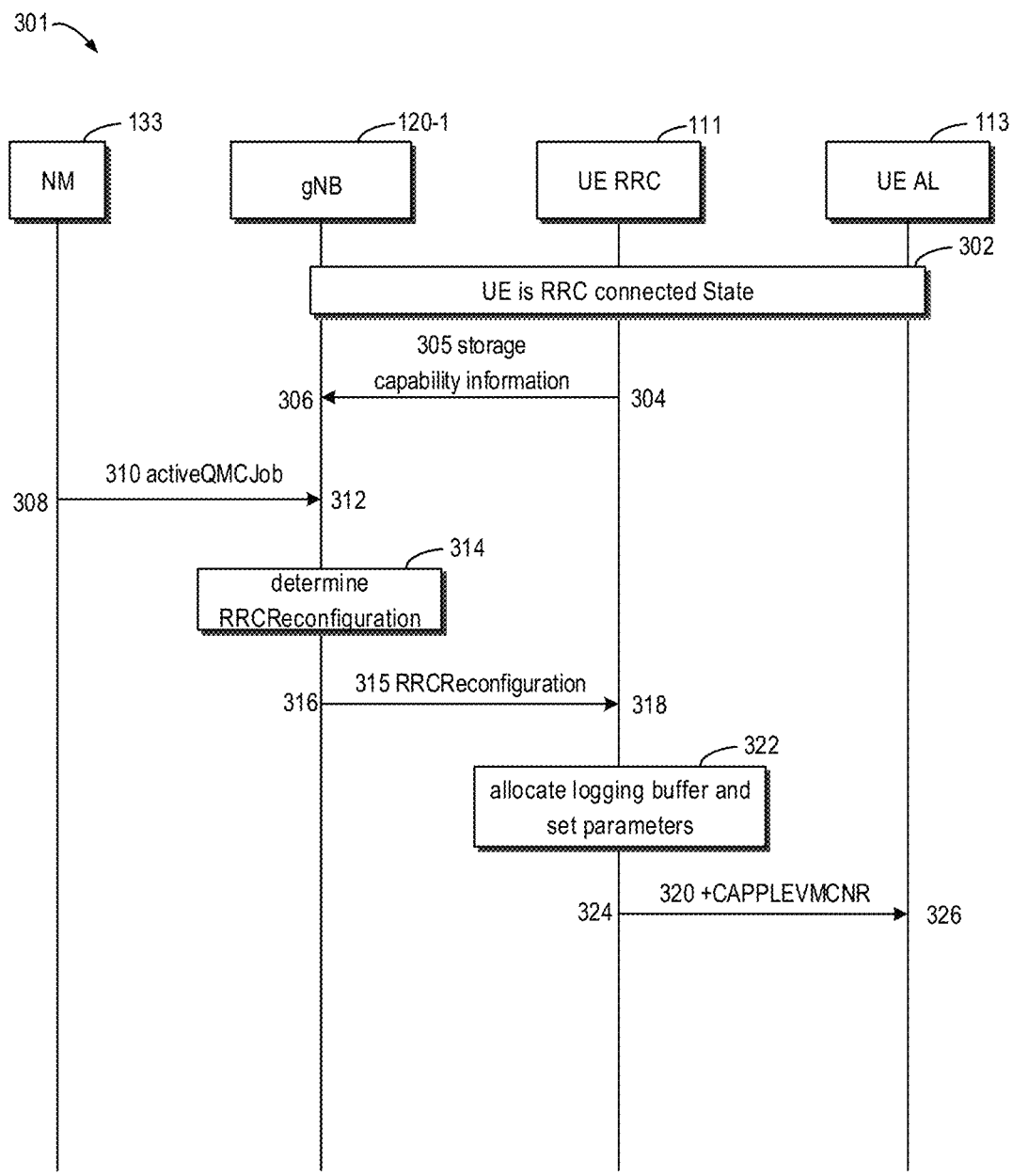
FIG. 3A illustrates an example process flow for a specific implementation of allocation of logging buffer in accordance with some example embodiments of the present disclosure.
Figure 3B:
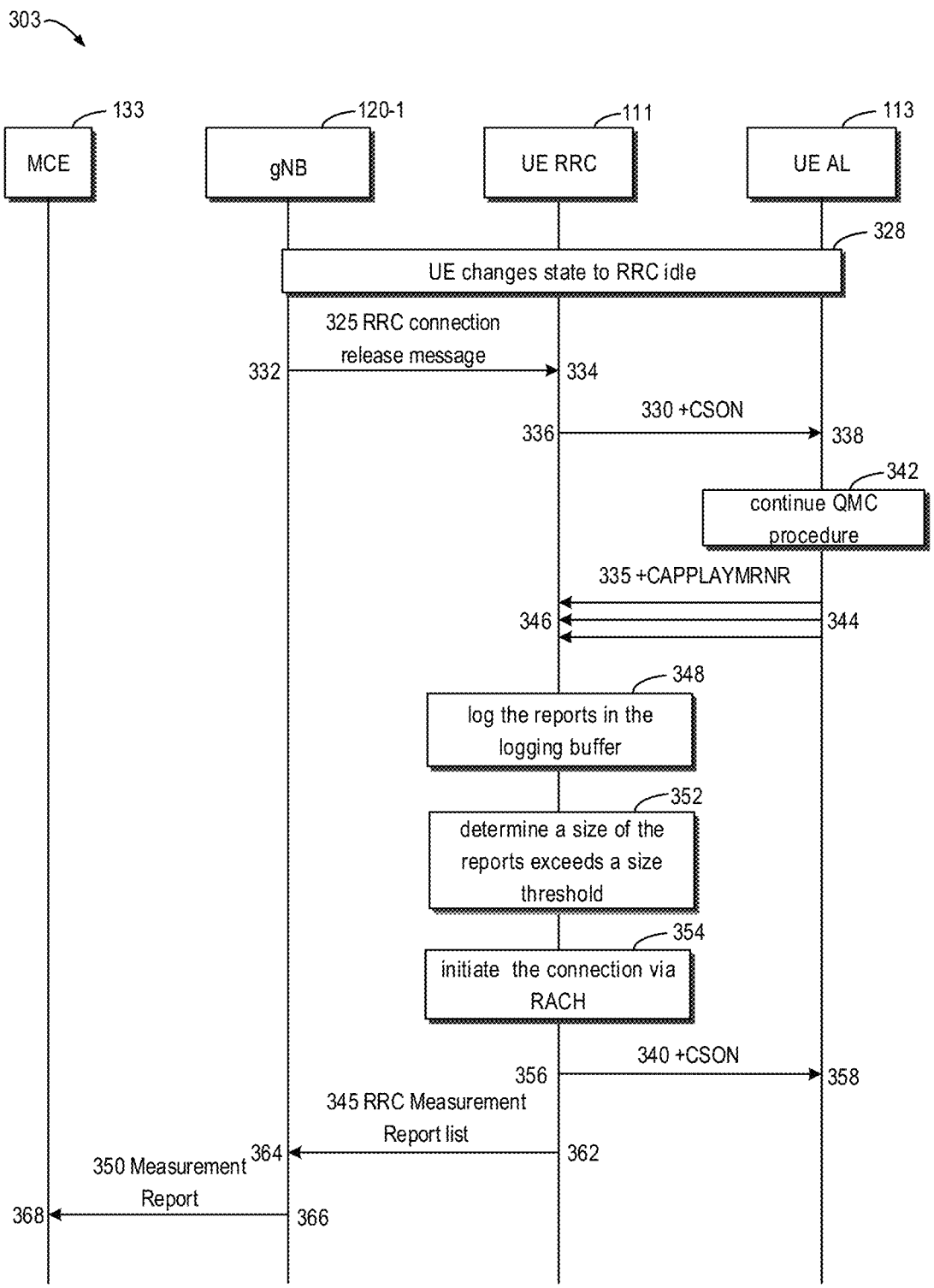
FIG. 3B illustrates an example process flow for a specific implementation of execution of QMC procedure in a non-connected state of a UE in accordance with some example embodiments of the present disclosure.

FIGS. 3A-3B illustrate a specific implementation of the QMC procedure in the non-connected mode in accordance with some example embodiments of the present disclosure. The QMC procedure involves two stages, namely configuration and allocation of logging buffer stage, and execution of QMC procedure stage. For the purpose of discussion, the process flow 301 as illustrated in FIG. 3A and the process flow 303 as illustrated in FIG. 3B will be described with reference to FIGS. 1A-1B. It would be appreciated that although the process flows 301 and 303 have been described referring to the network environment 101 of FIG. 1, the process flows 301 and 303 may be likewise applied to other similar communication scenarios.

FIG. 3A illustrates an example process flow 301 for a specific implementation of allocation of logging buffer in accordance with some example embodiments of the present disclosure. The process flow 301 involves the NM 133 of the core network device 130, the access network device 120-1, the RRC layer 111 of the terminal device 110-1 and the application layer 113 of the terminal device 110-1.

In the process flow 301, the terminal device 110-1 is RRC connected with the access network device 120-1 at 302. The storage capability information 305 is transmitted (304) from the RRC layer 111 to the access network device 120-1. After the access network device 120-1 receives (306) the storage capability information 305, the access network device 120-1 will be aware of the storage capability of the terminal device 110-1. The NM 133 transmits (308) a message activeQMCJob 310 to the access network device 120-1. For example, the NM 133 specifies along with the "activate-QMCJob" configuration message whether a QMC procedure is to be continued when UE is leaving the RRC connected state and enters into the RRC idle/inactive state. That is, activeQMCJob 310 may include a QMC configuration file and an indicator whether the QMC procedure is to be continued in case of idle/inactive state. Besides the indication, the rest of the activeQMCJob 310 may be the same of activeQMCJob 105 as illustrated in FIG. 1B. In some example embodiments, the indicator may be a CONTINUE_FLAG of BOOLEAN data type where TRUE indicates to continue the QMC procedure and FALSE indicates to terminate the QMC procedure (or vice versa). In the case of an indicator of FALSE or a lack of the indicator, the QMC procedure would be performed in line with current state-of-the-art.

Back to FIG. 3A, upon receiving (312) the activeQMCJob 310, the access network device 120-1 determines an RRCReconfiguration message 315 at 314. The access network device 120-1 creates the RRCReconfiguration message 315 based on the CONTINUE_FLAG in the activeQMCJob 310. The RRCReconfiguration message 310 may include AppLayerMeasConfig information. In case of the FLAG of TRUE, the appLayerMeasConfig information within the RRCReconfiguration message 315 is amended with configuration data for one or more new buffers for QMC data logging and indication about UE behavior to handle a full buffer during the idle and inactive state and a buffer filling threshold. The logging buffer may be created per ApplMeasID.

After the RRCReconfiguration message 315 is specified, the access network device 120-1 transmits (316) the RRCReconfiguration message 315 to the terminal device 110-1. When the terminal device 110-1 receives (318) the RRCReconfiguration message 315, the terminal device 110-1 allocates a logging buffer and sets the parameters for the logging buffer based on the RRCReconfiguration message 315 at 322. In other words, the configuration data in the RRCReconfiguration message 315 will trigger a set of logging buffers depending on the number of AppLayer-MeasId on the terminal device side. Alternatively the configuration data in the RRCReconfiguration message 315 will be memorized in terminal device side, and will be enabled to trigger a set of logging buffers when enter idle/inactive.

Since the QoE measurement is performed in AL 113, the RRC layer 111 transmits (324) an AT command +CAPPLEVMCNR 320 including the CONTINUE_FLAG to the AL 113 to notify the AL 113 that the QMC will be continued when the terminal device 110-1 enters into the non-connected state. In the illustrated embodiment, the logging procedure is carried out in AS domain, i.e., the RRC layer 111 of the terminal device 110-1. When the QoE measurement data is collected, the AL 113 will transmit the data to the RRC layer 111 to cause the data to be logged into the logging buffer allocated in the RRC layer 111. Therefore, the parameters for allocation of the logging buffer do not have to be transmitted to the AL 113. Only the CONTINUE_FLAG is forwarded to the AL 113 as an amendment of the existing AT command +CAPPLEVMCNR. In some alternative embodiments, the logging buffer may be allocated in the AL 113. In this case, all of the parameters for allocation of the logging buffer will be transmitted to AL 113.

FIG. 3B illustrates an example process flow 303 for a specific implementation of execution the QMC procedure in non-connected state in accordance with some example embodiments of the present disclosure. The execution of the QMC procedure in non-connected state starts when the terminal device 110-1 changes the RRC state from RRC connected to RRC idle/inactive state during activation of the QMC procedure.

Energy saving and resource efficiency are the typical reasons for a terminal device to initiate the abundance of the unicast connection. This changes the current situation of the access stratum. However, the service running on the application layer does not get a notice when AS gets changed. As illustrated in FIG. 3B, the terminal device 110-1 changes its state to the RRC idle at 328. Then, the access network device 120-1 transmits (332) a RRC connection release message 325 to the RRC layer 111. After the terminal device 110-1 receives (334) the RRC connection release message 325, the unicast connection between the terminal device 110-1 and the access network device 120-1 is released. In the meantime, the terminal device 110-1 changes to RRC idle state from the connected state and transmits (336) an AT command +CSON 330 to the AL 113 of the terminal device 120-1.

When the AL 113 receives the +CSON 330, the AL 113 is aware of the RRC connection release. According to the BOOLEAN variable in the CONTINUE_FLAG previously received by the AL 113, the AL 113 knows whether the QMC procedure should be terminated (e.g. CONTINUE_FLAG=FALSE) or continue (e.g. CONTINUE_FLAG=TRUE). In this embodiment, the AL 113 continues QMC procedure at 342 based on the CONTINUE_FLAG. The AL 113 transmits (344) AT commands +CAPPLAYMRNR 435 including reports of the QMC data via to the RRC layer 111 periodically (illustrated by multiple lines in FIG. 3B). That is, AL will regularly send the QMC reports of the corresponding AppLayerMeasIDs to the AS domain where they can be buffered as long as the filling threshold is not exceeded. Upon receiving (346) the +CAPPLAYMRNR 335, the RRC layer 111 logs the reports in the logging buffer at 348.

At some point, if the RRC layer 111 determines that the size of the reports logged in the logging buffer exceeds the size threshold of the buffer size at 352, the terminal device 110-1 initiates a connection procedure with the access network device 120-1 via a random access channel (RACH) at 354. The passing of the size threshold initiates RRC reactivation, i.e. resume for RRC inactive and reconnection for RRC idle which is getting in sync with network via RACH and resume or setup RRC connection, respectively.

After the connection is reestablished, the terminal device 110-1 transmits (356) an AT command +CSON 340 to the AL 113 to notify the reestablishment of the connection. In the meantime, RRC layer 111 transmits (362) a RRC Measurement Report list 345 including all the reports logged in the logging buffer to the access network device 120-1. Upon receiving (364) the RRC Measurement Report list 345, the access network device 120-1 forwards (366) the report list in a Measurement Report 350 to the MCE 133 of the core network device 130. The MCE 133 receives (368) the Measurement Report 350 and stores the Measurement Report 350 for subsequent analysis.

In the alternative embodiments of allocation of the logging buffer in the AL 113, the AL 113 may store the QMC data in the logging buffer and when the AL 113 determines that the size of the QMC data exceeds the size threshold or the buffer size, AL 113 may notify the RRC layer 111 to initiate a connection with the access network device 120-1. Then, the AL 113 transmits the reports of the QMC data to the MCE 133 via the RRC layer 111.

Figure 4:
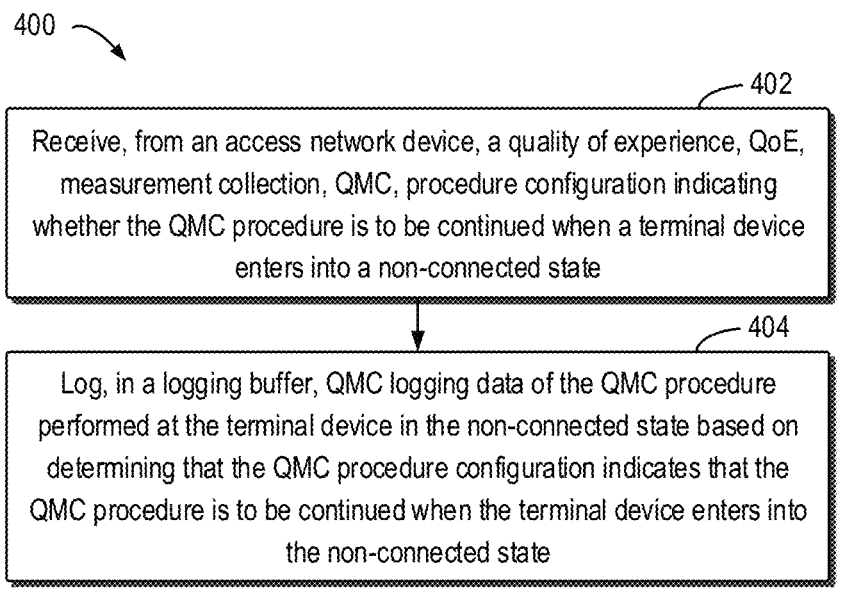
FIG. 4 illustrates a flowchart of an example method implemented by a terminal device in accordance with some example embodiments of the present disclosure.

FIG. 4 illustrates a flowchart 400 of a method implemented at a terminal device in accordance with some other embodiments of the present disclosure. For the purpose of discussion, the method 400 will be described from the perspective of the terminal device 110-1 with reference to FIG. 1.

At block 402, the terminal device 110-1 receives, from an access network device 120-1, a quality of experience, QoE, measurement collection, QMC, procedure configuration indicating whether the QMC procedure is to be continued when a terminal device enters into a non-connected state. At block 404, the terminal device 110-1 logs in a logging buffer, QMC logging data of the QMC procedure performed at the terminal device in the non-connected state based on determining that the QMC procedure configuration indicates that the QMC procedure is to be continued when the terminal device enters into the non-connected state.

In some example embodiments, the QMC procedure configuration further indicates at least one of the following: a buffer size of the logging buffer; a size threshold for the logging buffer; a location of the logging buffer; an applied state of the logging buffer; and an indication as to how the QMC procedure is controlled when the size threshold or the buffer size is exceeded.

In some example embodiments, the indication indicates one of the following: resuming or initiating a connection with the access network device for transmitting a report of the QMC logging data, followed by clearing the logging buffer; stopping logging QMC logging data, and discarding new QMC logging data; or overwriting logged QMC logging data with new QMC logging data.

In some example embodiments, the terminal device 110-1 further resumes the non-connected state based on determining that the report is transmitted. In some example embodiments, the size threshold is an absolute threshold or a relative threshold. In some example embodiments, the terminal device further allocates a plurality of logging buffers for storing a plurality of reports of a plurality of QMC procedures performed at the terminal device in the non-connected state. In this case, the logging buffer is one of the plurality of logging buffers.

In some example embodiments, the QMC procedure configuration is received for each of the plurality of QMC procedures. In some example embodiments, the terminal device further causes a RRC layer of the terminal device to transmit, to an application layer of the terminal device, an indication of whether the QMC procedure is to be continued when the terminal device enters into the non-connected state.

In some example embodiments, the buffer size is determined based on storage capability information of the terminal device. In some example embodiments, the non-connected state comprises a RRC idle state or a RRC inactive state. In some example embodiments, the QMC procedure configuration is comprised in a RRC message or a broadcast message. In some example embodiments, the RRC message comprises a RRC connection release message or a RRC reconfiguration message.

Figure 5:
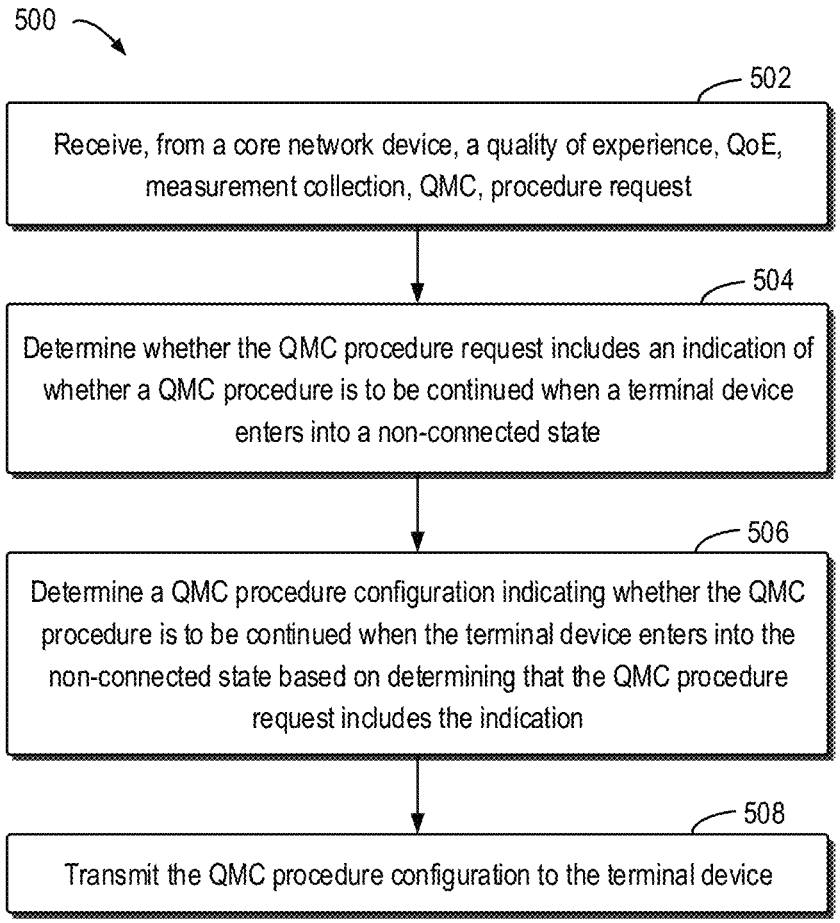
FIG. 5 illustrates a flowchart of an example method implemented by an access network device in accordance with some example embodiments of the present disclosure.

FIG. 5 illustrates a flowchart 500 of a method implemented at an access network device in accordance with some other embodiments of the present disclosure. For the purpose of discussion, the method 500 will be described from the perspective of the access network device 120-1 with reference to FIG. 1.

At block 502, the access network device 120-1 receives, from a core network device 130, a quality of experience, QoE, measurement collection, QMC, procedure request. At block 504, the access network device 120-1 determines whether the QMC procedure request includes an indication of whether a QMC procedure is to be continued when a terminal device enters into a non-connected state. At block 506, the access network device 120-1 determines a QMC procedure configuration indicating whether the QMC procedure is to be continued when the terminal device enters into the non-connected state based on determining that the QMC procedure request includes the indication. At block 508, the access network device 120-1 transmits the QMC procedure configuration to the terminal device 110-1.

In some example embodiments, in order to determine the QMC procedure configuration, the access network device 120-1 may determine at least one of the following of the QMC procedure configuration: a buffer size of the logging buffer; a size threshold for the logging buffer; a location of the logging buffer; an applied state of the logging buffer; and an indication as to how the QMC procedure is controlled when the size threshold or the buffer size is exceeded.

In some example embodiments, the indication may indicate one of the following: resuming or initiating a connection with the access network device for transmitting a report of the QMC logging data, followed by clearing the logging buffer; stopping logging QMC logging buffer, and discarding new QMC logging data; or overwriting logged QMC logging data with new QMC logging data.

In some example embodiments, the size threshold may be an absolute threshold or a relative threshold. In some example embodiments, in order to determine the QMC procedure configuration, the access network device 120-1 may receive storage capability information of the terminal device; and determines the buffer size of the logging buffer based on the storage capability information.

In some example embodiments, in order to transmit the QMC procedure configuration, the access network device 120-1 may transmit, to the terminal device, a RRC message or a broadcast message comprising the QMC procedure configuration. In some example embodiments, the RRC message may comprise a RRC reconfiguration message or a RRC connection release message. In some example embodiments, the non-connected state may comprise a RRC idle state or a RRC inactive state.

In some example embodiments, the access network device may further determine the QMC procedure configuration indicating whether the QMC procedure is to be continued when the terminal device enters into the non-connected state in accordance with a service associated with the QMC procedure request based on determining that the QMC procedure request does not include the indication.

Figure 6:
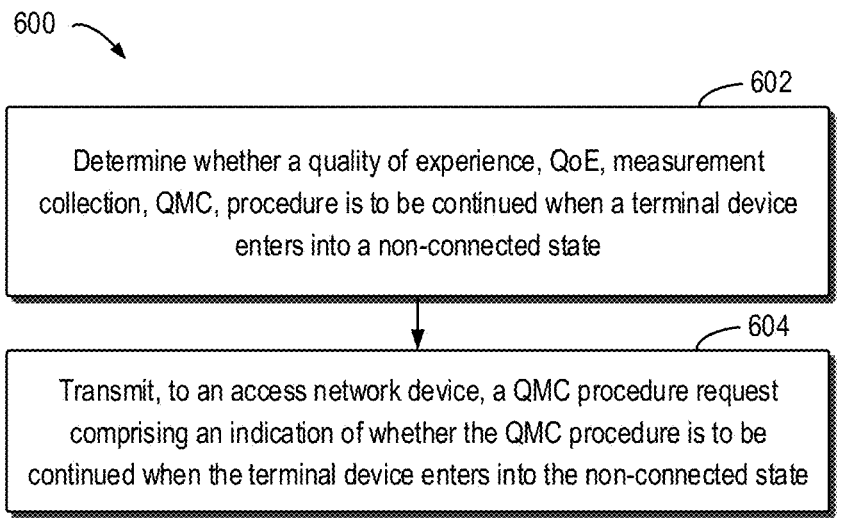
FIG. 6 illustrates a flowchart of an example method implemented by an core network device in accordance with some example embodiments of the present disclosure.

FIG. 6 illustrates a flowchart 600 of a method implemented at a core network device in accordance with some other embodiments of the present disclosure. For the purpose of discussion, the method 600 will be described from the perspective of the core network device 130 with reference to FIG. 1.

At block 602, the core network device 130 determines whether a quality of experience, QoE, measurement collection, QMC, procedure is to be continued when a terminal device enters into a non-connected state. At block 604, the core network device 130 transmits, to an access network device, a QMC procedure request comprising an indication of whether the QMC procedure is to be continued when the terminal device enters into the non-connected state. In some example embodiments, the core network device 130 may further receives a report of QMC logging data of the QMC procedure from the terminal device; and store the report.

Figure 7:
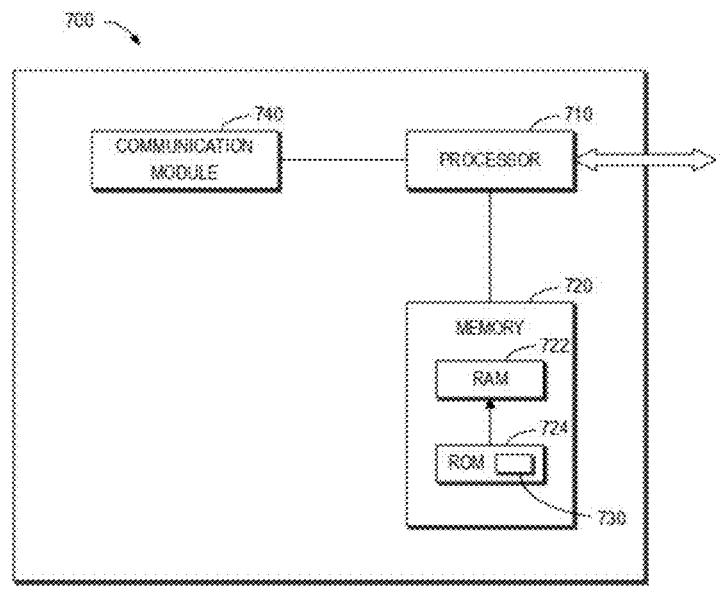
FIG. 7 illustrates a simplified block diagram of a device that is suitable for implementing some example embodiments of the present disclosure.

FIG. 7 illustrates a simplified block diagram of a device 700 that is suitable for implementing some example embodiments of the present disclosure. The device 700 may be provided to implement a communication device, for example, the terminal devices 110, the access network devices 120, or the core network device 130 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 2 to 3B. The embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 800 may load the program 730 from the computer readable medium to the RAM 722 for execution. The computer readable medium may include any types of tangible non-volatile storage, such as ROM, EPROM, a flash memory, a hard disk, CD, DVD, and the like.

Figure 8:
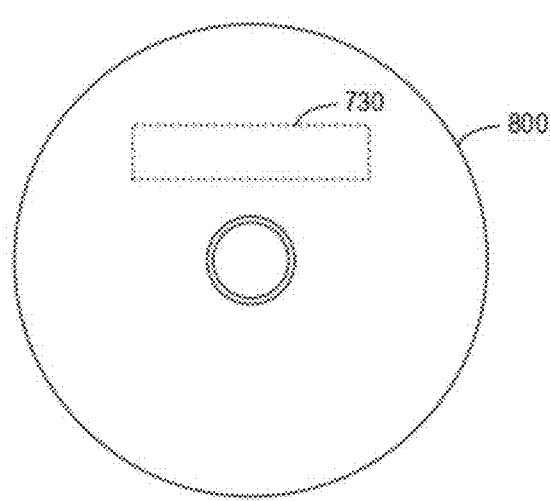
FIG. 8 illustrates a block diagram of an example of a computer readable medium in accordance with some example embodiments of the present disclosure.

FIG. 8 illustrates a block diagram of an example of a computer readable medium 800 in accordance with some example embodiments of the present disclosure. The computer readable medium 800 has the program 730 stored thereon. It is noted that although the computer readable medium 800 is depicted in form of CD or DVD in FIG. 8, the computer readable medium 800 may be in any other form suitable for carry or hold the program 730.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400, 500 or 600 as described above with reference to FIG. 4, 5 or 6. Generally, program modules include routines, programs, libraries, objects, classes, components, data structures, or the like that perform particular tasks or implement particular abstract data types.

The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
at least one processor; and
at least one memory storing instructions that, when executed by the at least one processor, cause the terminal device at least to:
receive, from an access network device, a quality of experience (QoE) measurement collection (QMC) procedure configuration indicating whether a QMC procedure is to be continued when the terminal device enters into a non-connected state; and
based on determining that the QMC procedure configuration indicates that the QMC procedure is to be continued when the terminal device enters into the non-connected state, log, in a logging buffer, QMC logging data of the QMC procedure performed at the terminal device in the non-connected state.

2. The terminal device of claim 1, wherein the QMC procedure configuration further indicates at least one of the following:
a buffer size of the logging buffer;
a size threshold for the logging buffer;
a location of the logging buffer;
an applied state of the logging buffer; or
an indication as to how the QMC procedure is controlled when the size threshold or the buffer size is exceeded.

3. The terminal device of claim 2, wherein the indication indicates one of the following:
resuming or initiating a connection with the access network device for transmitting a report of the QMC logging data, followed by clearing the logging buffer;
stopping logging QMC logging data, and discarding new QMC logging data; or
overwriting logged QMC logging data with new QMC logging data.

4. The terminal device of claim 3, wherein the terminal device is further caused to:
based on determining that the report is transmitted, resume the non-connected state.

5. The terminal device of claim 2, wherein the size threshold is an absolute threshold or a relative threshold.

6. The terminal device of claim 2, wherein the buffer size is determined based on storage capability information of the terminal device.

7. The terminal device of claim 1, wherein the terminal device is further caused to:
allocate a plurality of logging buffers for storing a plurality of reports of a plurality of QMC procedures performed at the terminal device in the non-connected state, the logging buffer being one of the plurality of logging buffers.

8. The terminal device of claim 7, wherein the QMC procedure configuration is received for each of the plurality of QMC procedures.

9. The terminal device of claim 1, wherein the terminal device is further caused to:
cause a radio resource control (RRC) layer of the terminal device to transmit, to an application layer of the terminal device, an indication of whether the QMC procedure is to be continued when the terminal device enters into the non-connected state.

10. The terminal device of claim 1, wherein the non-connected state comprises a RRC idle state or a RRC inactive state.

11. The terminal device of claim 1, wherein the QMC procedure configuration is comprised in a RRC message or a broadcast message.

12. The terminal device of claim 11, wherein the RRC message comprises a RRC connection release message or a RRC reconfiguration message.

13. An access network device comprising:
at least one processor; and
at least one memory storing instructions that, when executed by the at least one processor, cause the access network device at least to:
receive, from a core network device, a quality of experience (QoE) measurement collection (QMC) procedure request;
determine whether the QMC procedure request includes an indication of whether a QMC procedure is to be continued when a terminal device enters into a non-connected state;
based on determining that the QMC procedure request includes the indication, determine a QMC procedure configuration indicating whether the QMC procedure is to be continued when the terminal device enters into the non-connected state; and
transmit the QMC procedure configuration to the terminal device.

14. The access network device of claim 13, wherein the access network device is caused to determine the QMC procedure configuration by determining at least one of the following of the QMC procedure configuration:
a buffer size of the logging buffer;
a size threshold for the logging buffer;
a location of the logging buffer;
an applied state of the logging buffer; or
an indication as to how the QMC procedure is controlled when the size threshold or the buffer size is exceeded.

15. The access network device of claim 14, wherein the indication indicates one of the following:
resuming or initiating a connection with the access network device for transmitting a report of the QMC logging data, followed by clearing the logging buffer;
stopping logging QMC logging buffer, and discarding new QMC logging data; or
overwriting logged QMC logging data with new QMC logging data.

16. The access network device of claim 14, wherein the size threshold is an absolute threshold or a relative threshold.

17. The access network device of claim 14, wherein the access network device is caused to determine the QMC procedure configuration by:
receiving storage capability information of the terminal device; and
determining the buffer size of the logging buffer based on the storage capability information.

18. The access network device of claim 13, wherein the access network device is caused to transmit the QMC procedure configuration by:
transmitting, to the terminal device, a radio resource control (RRC) message or a broadcast message comprising the QMC procedure configuration.

19. The access network device of claim 13, wherein the access network device is caused to:
based on determining that the QMC procedure request does not include the indication, determine the QMC procedure configuration indicating whether the QMC procedure is to be continued when the terminal device enters into the non-connected state in accordance with a service associated with the QMC procedure request.

20. A method comprising:
receiving, from an access network device, a quality of experience (QoE) measurement collection (QMC) procedure configuration indicating whether the QMC procedure is to be continued when a terminal device enters into a non-connected state; and
based on determining that the QMC procedure configuration indicates that the QMC procedure is to be continued when the terminal device enters into the non-connected state, logging, in a logging buffer, QMC logging data of the QMC procedure performed at the terminal device in the non-connected state.

* * * * *